Figure 2:
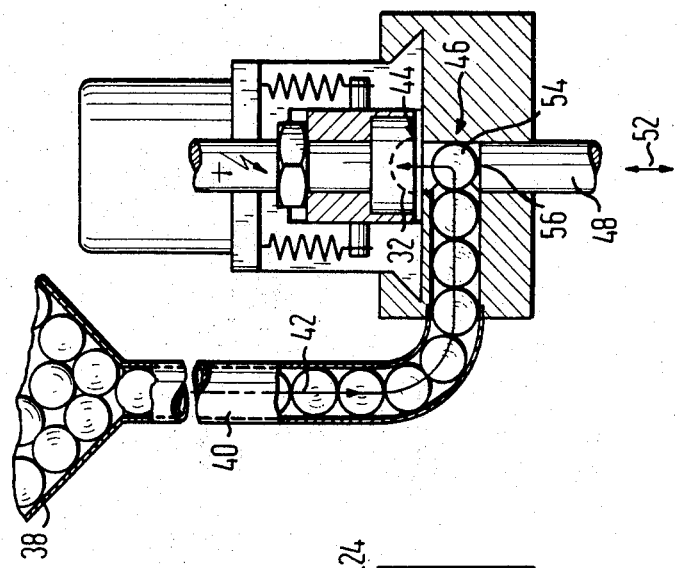

United States Patent
Bihler

[15] 3,694,614
[45] Sept. 26, 1972

[54] APPARATUS FOR PROVIDING CONTACT HEADS ON CONTACT MEMBERS

[72] Inventor: Otto Bihler, Halblech-Fussen, Germany

[73] Assignee: Otto Bihler KG, Halblech-Fussen, Germany

[22] Filed: Jan. 28, 1971

[21] Appl. No.: 110,441

[30] Foreign Application Priority Data

Feb. 4, 1970 Germany..........P 20 05 094.6

[52] U.S. Cl. .......................219/103, 29/493, 219/79
[51] Int. Cl. .............................................B23k 9/02
[58] Field of Search..........219/103, 104, 107, 79, 80; 29/630, 493

[56] References Cited

UNITED STATES PATENTS

| | | | |
|---|---|---|---|
| 3,488,841 | 1/1970 | Stern | 219/104 X |
| 3,194,940 | 7/1965 | Thomson et al. | 219/79 X |
| 2,578,074 | 12/1951 | Kershaw | 219/103 |
| 2,154,243 | 4/1939 | Langhaus | 219/103 |
| 3,294,950 | 12/1966 | Hagner et al. | 219/103 |

*Primary Examiner*—J. V. Truhe
*Assistant Examiner*—L. A. Schutzman
*Attorney*—Kelman & Berman

[57] ABSTRACT

In a welding apparatus for welding contact beads on a strip of spring metal, the bead material is fed in the form of pellets to a receptacle on one of the welding electrodes. The electrode is mounted on a carrier by means of a pivoted arm. In a position of the carrier remote from the welding area, a single pellet is transferred from a conduit to the receptacle. The carrier then moves to the welding area, the pivoted arm is swung to bring the receptacle into engagement with a strip which is also engaged by another electrode, and the pellet in the receptacle is welded to the strip.

Contact members for electric circuits are frequently to be provided with contact heads of highly conductive material; this is true, e.g., for spring metal contact members which have a rather poor electric conductivity themselves. This invention relates to mechanical feeding systems for feeding contact metal pellets to the contact member in welding apparatuses.

8 Claims, 8 Drawing Figures

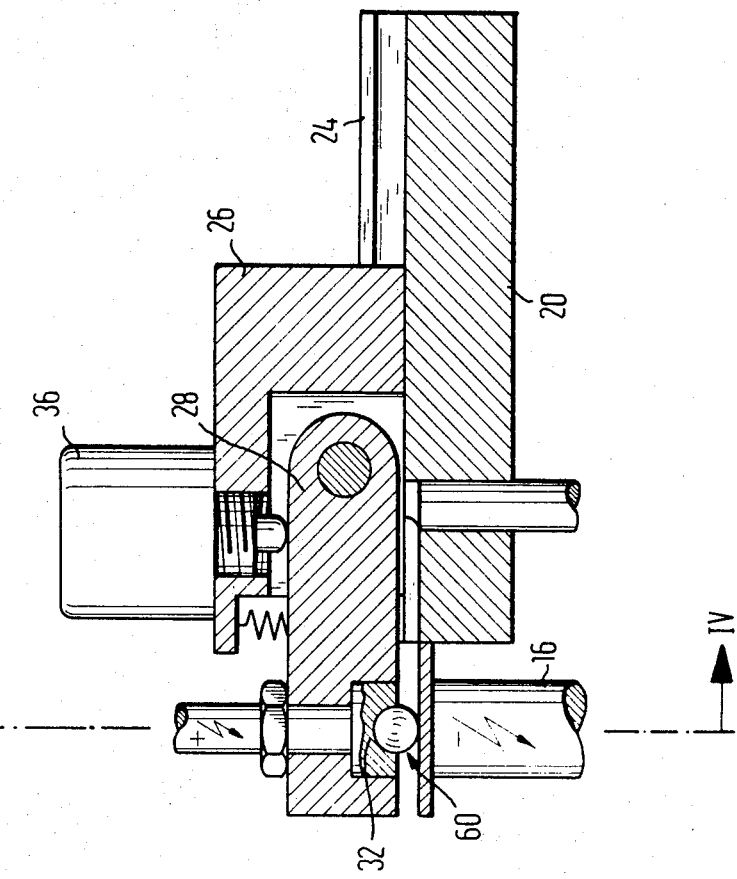

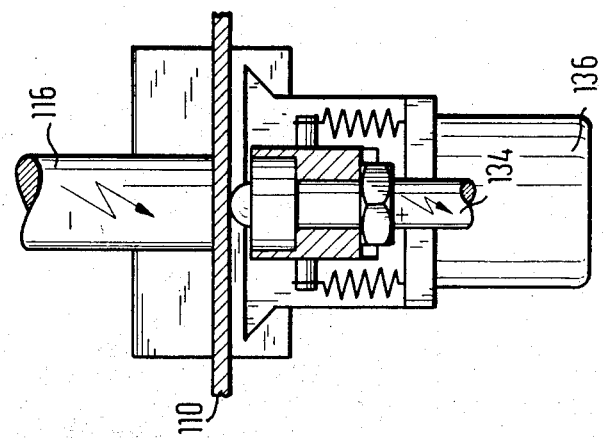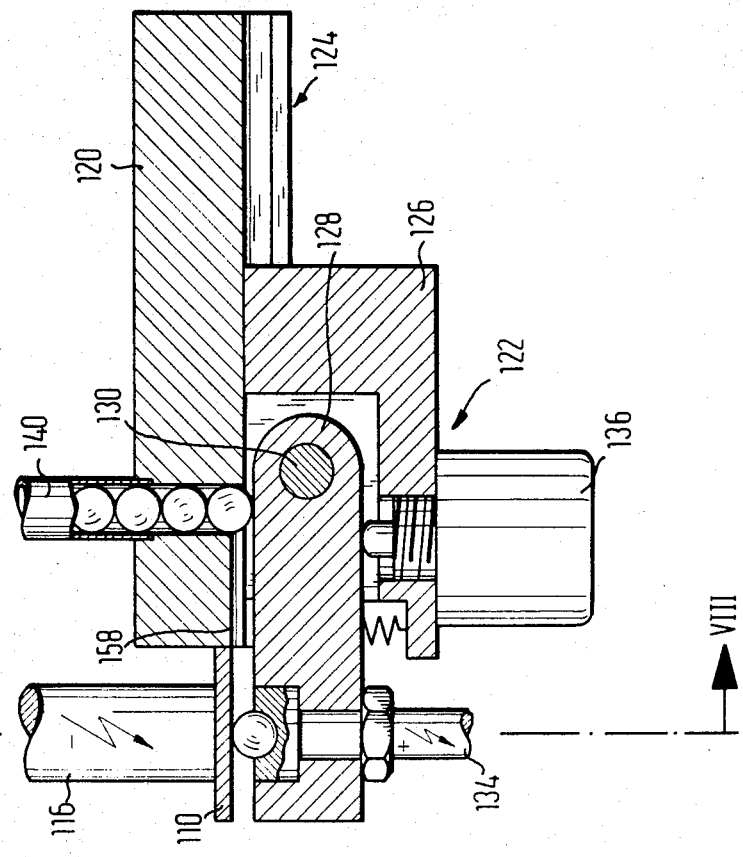

APPARATUS FOR PROVIDING CONTACT HEADS ON CONTACT MEMBERS

The primary object of this invention is the provision of mechanical feeding means in a welding apparatus for feeding contact metal pellets in welding position with respect to the contact member clamped in the welding apparatus.

The problem of positioning the contact metal pellet with respect to the contact member is different depending on the direction of the face of the contact member to which the contact head is to be welded.

A further object of this invention is to provide feeding means for feeding the contact metal pellet into welding position when the pellet is to be welded to an upwardly directed face.

A further object of this invention is to provide means for feeding the contact metal pellet into welding position when the pellet is to be welded to a downwardly directed face.

Figure 1:
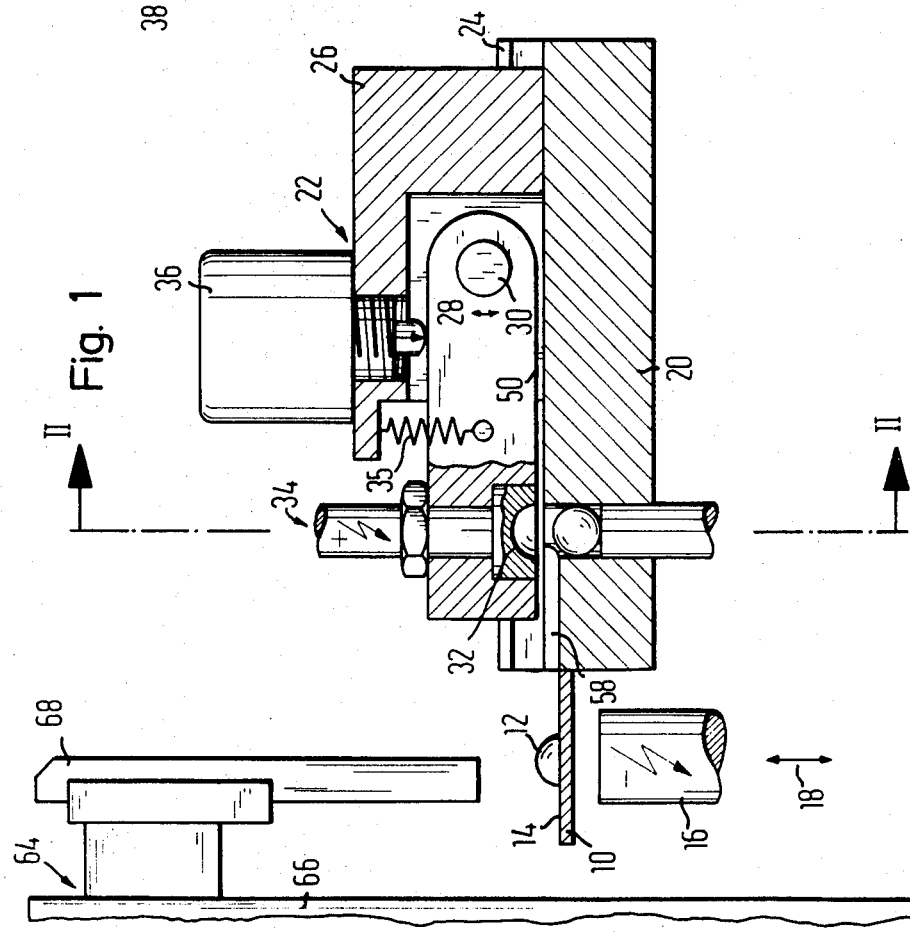
Figure 6:
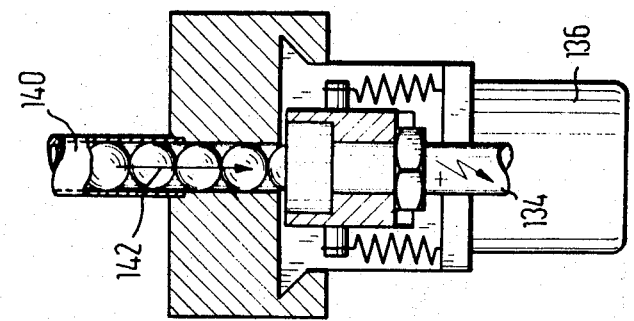
Figure 5:
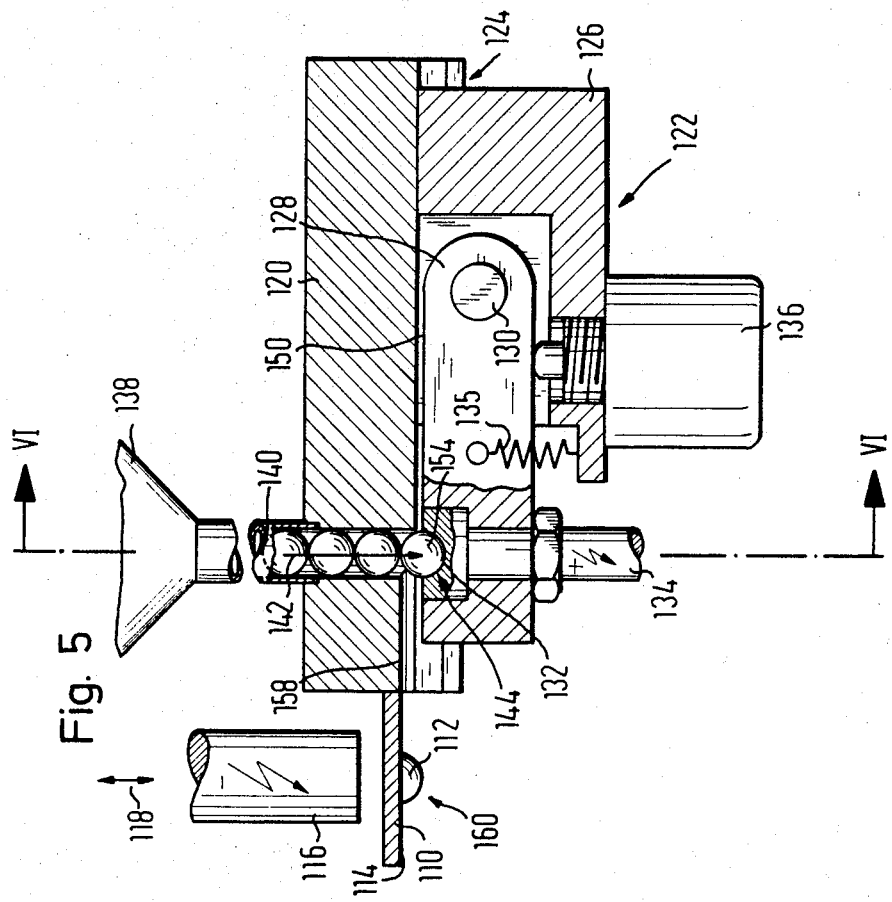

Other features, additional objects, and many of the attendant advantages of this invention will readily become apparent from the following description of preferred embodiments when considered in connection with the drawings, in which:

FIG. 1 shows an elevational section through a first embodiment of the apparatus according to the invention, FIG. 2 is a section along the line II — II of FIG. 1, FIG. 3 is a fragmentary section corresponding to that of FIG. 1 and showing the apparatus in another operating position, FIG. 4 is a section along the line IV — IV of FIG. 3, FIG. 5 shows an elevational section corresponding to that of FIG. 1 of a second embodiment of an apparatus according to this invention, FIG. 6 is a section along the line VI — VI of FIG. 5, FIG. 7 shows an elevational section of the apparatus of FIG. 5 in another operating position, and FIG. 8 is a section along line VIII — VIII of FIG. 7.

In the embodiment according to FIGS. 1 to 4 a metal tape 10 is shown which is continuously advanced at right angles to the drawing plane of FIG. 1 and is secured in processing position by clamping tools (not shown). Contact metal heads or heads 12 are to be mounted on the upwardly directed face 14 of the metal tape 10; an electrode rod 16 is shown which is movable upwardly and downwardly in the direction of the double-arrow 18 so that it may be approached for the welding process to the lower side of the metal tape 10 while said tape is in clamped position which prevents the tape from moving vertically. The apparatus furthermore comprises a worktable 20 which is stationary relative to the clamping tools not shown. A movable feeding device 22 is mounted on said worktable 20 and is longitudinally displaceable by means of a carrier or carriage 26 along a guide 24 in the drawing plane. A mounting or swivel arm 28 is pivotally mounted at 30 on the carriage 26. This swivel arm 30 carries adjacent the free end thereof a contact metal receptacle or receiving pit 32 which is part of a positive counter electrode 34. The swivel arm 28 is secured in an upper end position by a spiral tension spring 35 and may be pivoted downwardly by a pneumatic actuator 36.

As shown in FIG. 2 a supply line or feeding conduit 40, the axis of which is indicated by an arrow 42, leads from a hopper 38 receiving contact metal pellets to the contact metal receiving area 44. This supply line 40 makes a 90° turn at 46 below the contact metal receiving area 44. A lifting piston or plunger 48 is arranged below this turn and is shown in FIG. 2 in its lowermost position. The distance between the upper end of the lifting piston 48 and the bottom face 50 of the swivel arm 28 in the terminal portion of the conduit 40 is not greater than $1.5\,d$, wherein $d$ equals the cross-section of the contact metal pellets.

The apparatus described heretofore operates as follows:

In FIG. 1 and 2 the contact metal receiving pit 32 is in the contact metal receiving area 44. By a lifting movement of the piston 48, which is movable upwardly and downwardly in the direction of the double-arrow 52, the leading contact metal pellet 54 is lifted into the contact metal receiving pit 32 while the bend of the conduit 40 is obstructed by the piston 48. The lifted pellet is preformed at its bottom surface which subsequently will be the welding basis. The contact metal pellet is, e.g., flattened or otherwise prepared, e.g., by forming projections for the subsequent welding step. This allows a shorter welding time since the deformation to be carried out during the welding process is less. The piston 48 is slightly withdrawn, but the upper end face still secures the contact metal pellet 54 within this contact metal receiving pit 32. Thereupon the carriage 26 is moved toward the position of FIG. 3. The lifting piston 48 may then completely return to the position shown in FIG. 2 whereupon the next contact metal pellet 54 in FIG. 2 may arrive at a point below the contact metal receiving pit 32, there being only space for one pellet between the upper end face 56 of the lifting piston 48 and the surface 50 of the swivel arm 28.

While carriage 26 moves from the position shown in FIG. 1 to the position of FIG. 3, the contact metal pellet 54 is secured by the contact metal receiving pit 32 on the one hand and guided by a groove 58 in the worktable on the other hand so that the pellet cannot drop out of the contact metal receiving pit 32. The orifice of the conduit 40 above the plunger or piston 48 is blocked by the bottom face 50 of the mounting or swivel arm 28.

As shown in FIG. 3, the contact metal receiving pit 32 has reached the welding area 60 and the welding process may begin. For this purpose the electrode 16 is raised. The swivel arm 28 is pressed downwardly by the pneumatic actuator 36 while the contact metal pellet 54 is deformed to a head 12 as shown in FIG. 1. When the welding process is finished the pneumatic actuator 36 is disconnected whereupon the spiral tension spring 35 lifts the swivel arm 28 so that the metal tape 10 may be advanced and the carriage 26 with the swivel arm 28 may return to the position shown in FIG. 1 and 2. FIG. 1 shows a worktable 66 of a wire-bending machine 64 wherein the tape 10 may be processed by tools 68.

In FIG. 5 to 8 corresponding parts are designated with the same reference numerals as shown in FIG. 1 to 4 multiplied by the number 100.

The embodiment according to FIG. 5 to 8 operates as follows:

In FIG. 5 the contact metal receiving pit 132 is in the contact metal receiving area 144. In this figure a contact metal pellet 154 enters the contact metal receiving pit 132. The carriage 126 is subsequently moved to the left in the direction toward the position according to FIG. 7. The closing surface 150 closes the lower outlet of the line 140 preventing the following contact metal pellet 154 from leaving the line 140. Along its path from the contact metal receiving area 144 to the welding position 160 the contact metal pellet 154 is guided by the contact metal receiving pit 132 and prevented from dropping out of contact metal receiving pit 132 by the groove 158.

As soon as the position shown in FIG. 7 is reached, the electrode 116 approaches the tape 110 from above. The welding current is subsequently switched on. The swivel arm 128 is pivoted upwardly by the pneumatic actuator 136 so that the head 112 according to FIG. 5 is formed. After termination of the welding process the pneumatic actuator 136 is again switched off so that the tape 110 may continue to move and the carriage 126 may return to the position shown in FIG. 5.

Changes and modifications of the illustrated embodiments of the invention will readily suggest themselves to those skilled in the art, and it should be understood that the invention is not limited to the examples chosen for the purpose of the disclosure.

What is claimed is:

1. A welding apparatus comprising, in combination:
   a. means for holding a contact member in a welding area;
   b. a first electrode movable toward and away from a position of engagement with a contact member held in said area;
   c. a carrier;
   d. guide means for guiding said carrier in a path between a first position remote from said area and a second position adjacent said area;
   e. a second electrode mounted on said carrier for movement therewith in said path,
      1. said second electrode being formed with a receptacle;
   f. feeding means for feeding a pellet of contact metal to said receptacle while said carrier is in said first position thereof;
   g. securing means for securing said pellet in said receptacle during movement of said carrier from said first position to said second position; and
   h. actuating means for moving said second electrode on said carrier transversely of said path when said carrier is in said second position thereof, and for thereby moving said receptacle and the pellet therein toward said contact member.

2. An apparatus as set forth in claim 1, further comprising a mounting member pivotally secured to said carrier, said actuating means pivotally moving said mounting member on said carrier, said second electrode being fastened to said mounting member for joint pivotal movement transversely of said path.

3. An apparatus as set forth in claim 2, wherein said actuating means include yieldably resilient means on said carrier biasing said mounting member to pivot in one direction, and an actuator mounted on said carrier and operable for pivoting said mounting member in a direction opposite to said one direction against the restraint of said yieldably resilient means, said receptacle moving toward said contact member when said mounting member pivots in said opposite direction.

4. An apparatus as set forth in claim 1, said feeding means including a source of said pellets, a conduit leading from said source to said receptacle in said first position of the carrier, and limiting means for limiting transfer of pellets from said conduit to said receptacle to a single pellet after each movement of said carrier into said first position thereof.

5. An apparatus as set forth in claim 4, further comprising blocking means for blocking discharge of pellets from said conduit while said carrier is remote from said first position.

6. An apparatus as set forth in claim 5, wherein said limiting means include a substantially rectangular turn in said conduit remote from said source, the terminal portion of said conduit extending from said bend in a direction away from said source and being dimensioned to receive a single pellet only, and a plunger mounted for movement into and out of said terminal portion for transferring a pellet received in said terminal portion into said receptacle in said first position of the carrier while obstructing said bend to the movement of an additional pellet into said terminal portion.

7. An apparatus as set forth in claim 6, wherein said terminal portion has an orifice and said mounting arm has a face, said orifice being aligned with said receptacle in said first position of said carrier, and said face obstructing said orifice and constituting said blocking means when said carrier is remote from said first position.

8. An apparatus as set forth in claim 5, wherein said conduit has an orifice remote from said source and said mounting arm has a face, said orifice being aligned with said receptacle in the first position of said carrier, and said face constituting said blocking means and obstructing said orifice while said carrier is remote from said first position.

* * * * *